United States Patent [19]

Yoshihara et al.

[11] Patent Number: 5,168,295
[45] Date of Patent: Dec. 1, 1992

[54] POWDER DIVIDING DEVICE FOR CAMERA

[75] Inventors: Akira Yoshihara, Kanagawa; Kazushige Ichino, Tokyo, both of Japan

[73] Assignee: Canon Kabushiki Kaisha, Tokyo, Japan

[21] Appl. No.: 798,052

[22] Filed: Nov. 27, 1991

Related U.S. Application Data

[63] Continuation of Ser. No. 637,335, Jan. 3, 1991, abandoned.

[30] Foreign Application Priority Data

Jan. 10, 1990 [JP] Japan .................................. 2-002992
Jan. 10, 1990 [JP] Japan .................................. 2-002993

[51] Int. Cl.$^5$ .............................................. G03B 1/18
[52] U.S. Cl. .............................. 354/173.1; 354/195.1; 354/234.1
[58] Field of Search ............. 354/173.1, 173.11, 195.1, 354/234.1

[56] References Cited

U.S. PATENT DOCUMENTS 4,542,865  9/1985  Yamada et al. ...................... 242/205
4,572,636  2/1986  Konno ............................ 354/173.11

Primary Examiner—Michael L. Gellner
Assistant Examiner—Howard B. Blankenship
Attorney, Agent, or Firm—Fitzpatrick, Cella, Harper & Scinto

[57] ABSTRACT

A power dividing device for a camera is provided with a motor, an output part for outputting a driving force of the motor, a plurality of transmission parts for transmitting the driving force of the motor to a plurality of individual operating parts of the camera to be operated by the driving force of the motor, a connecting part for enabling the output part to be selectively connected to the aforesaid plurality of transmission parts in random order, and a controlling part for controlling the connecting part by determining a positional relationship between the output part and the aforesaid plurality of transmission parts.

53 Claims, 15 Drawing Sheets

POWDER DIVIDING DEVICE FOR CAMERA

This application is a continuation of application Ser. No. 07/637,335 filed Jan. 3, 1991, now abandoned.

BACKGROUND OF THE INVENTION

1. Field of the Invention

The present invention relates to a power dividing device for a camera for selectively transmitting the driving force of a motor to a plurality of operating parts of the camera.

2. Description of the Related Art

As is well known, recently developed types of cameras are automated in such a manner so as to utilize the driving forces of motors to implement various operations such as winding and rewinding of a film, driving of a zoom barrel, adjusting focus, opening and closing of a shutter and shifting to a close-up photography mode.

To drive mechanisms for performing these operations, a typical automated camera is provided with a plurality of motors, and a particular type of camera adopts sequential means utilizing a differential mechanism, etc. which matches the sequence of the camera itself.

However, as the number of motors used increases, it becomes more difficult to reduce the size of a camera and a mounting process for wiring becomes complicated. This leads to the disadvantage that the costs of parts including the motors, and assembly costs increase.

In addition, in an arrangement which adopts the aforesaid sequential means, a complicated mechanism, such as a differential mechanism, must be employed which makes it difficult to assure operational stability. With this kind of sequential means, since it is difficult to implement an operation other than a particular sequence, it will be impossible to develop a camera system and add new functions to the same. For the same reasons, it is difficult to select a standard mechanism and apply it to many kinds of products as common components, and it has been necessary, therefore, to design a new mechanism for each kind of product. As a result, the number of processes required for development excessively increases and the effect of mass production is limited.

SUMMARY OF THE INVENTION

It is, therefore, an object of the present invention to provide a power dividing device for a camera which has a simple construction, a compact size and a reduced price and which can reliably realize a stable operation as well as improved versatility and expandability.

To achieve the above object, the present invention in one aspect pertains to a power dividing device for a camera which is provided with a motor, output means for outputting a driving force of the motor, a plurality of transmission means for transmitting the driving force of the motor to a plurality of individual operating parts of the camera to be operated by the driving force of the motor, connecting means for enabling the output means to be selectively connected to the aforesaid plurality of transmission means in random order, and controlling means for controlling the connecting means by determining a positional relationship between the output means and the aforesaid plurality of transmission means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 12 is an exploded perspective view showing a camera according to third embodiment;

FIG. 13 is a schematic plan view of the arrangement shown in FIG. 12;

FIG. 14 is a bottom side view of FIG. 12;

FIG. 15 is a vertical sectional view showing the essential parts of FIG. 12;

DETAILED DESCRIPTION OF THE PREFERRED EMBODIMENTS

Preferred embodiments of the present invention will be described below with reference to the accompanying drawings.

FIGS. 1 to 8 are diagrammatic views showing a first embodiment of the present invention.

Figure 1:
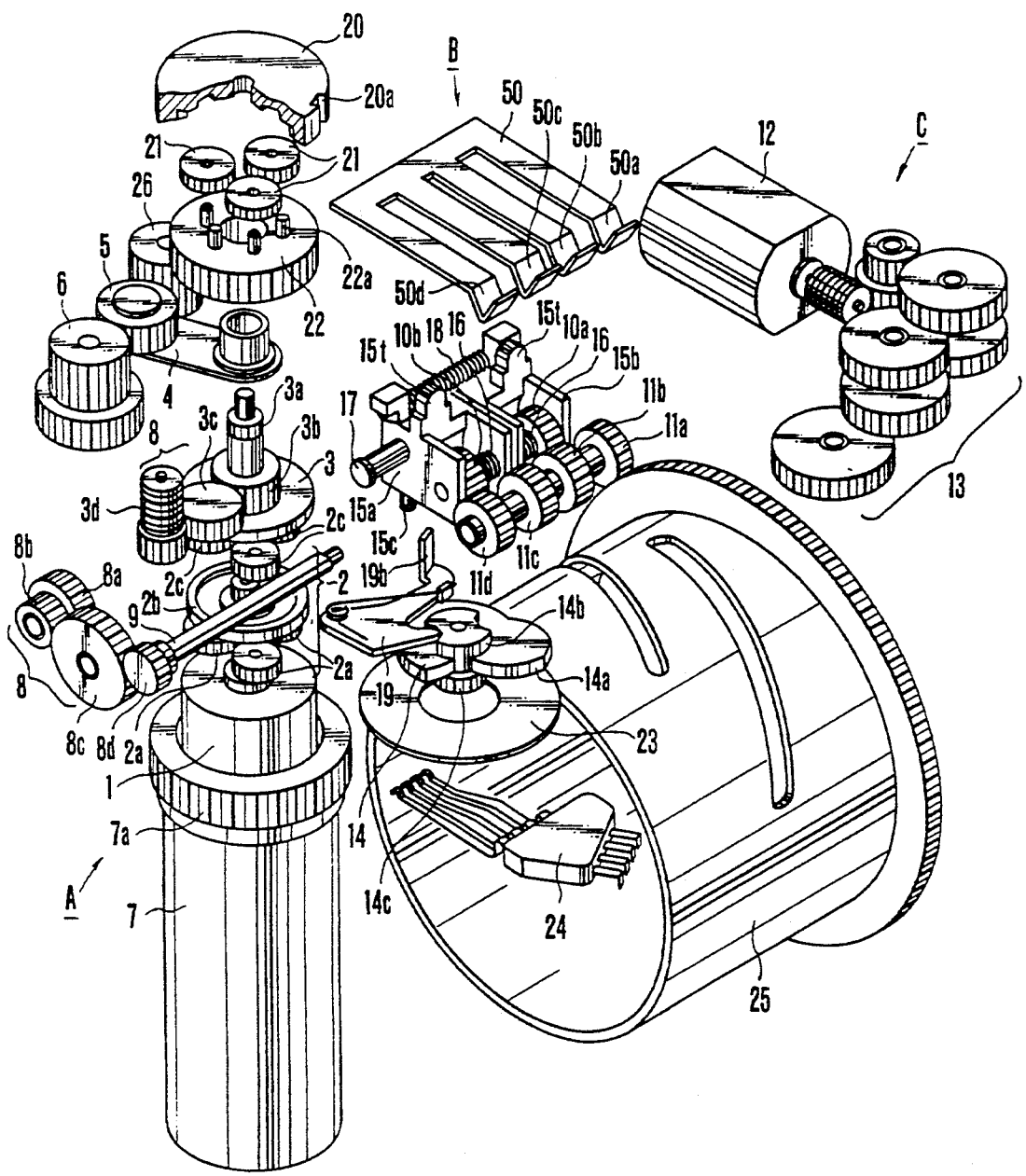
FIG. 1 is an exploded perspective view of the essential parts of a camera, showing a first embodiment of the present invention.

FIG. 1 is a perspective view showing the essential parts of a camera according to the first embodiment. As shown in FIG. 1, the first embodiment generally comprises a driving gear part A including a driving motor 1, a dividing part B for selecting a particular dividing gear, and a dividing motor part C for driving the dividing part B. A zoom barrel 25 is shown as the operating part of the camera to which a driving force is divided by the dividing part B, and a film-winding spool 7 is also provided.

The driving gear part A includes the driving motor 1. The driving force of the driving motor 1 is transmitted to a driving-force transmission shaft 9 through a gear train 8 so that the driving-force transmission shaft 9 can normally be driven.

Figure 5:
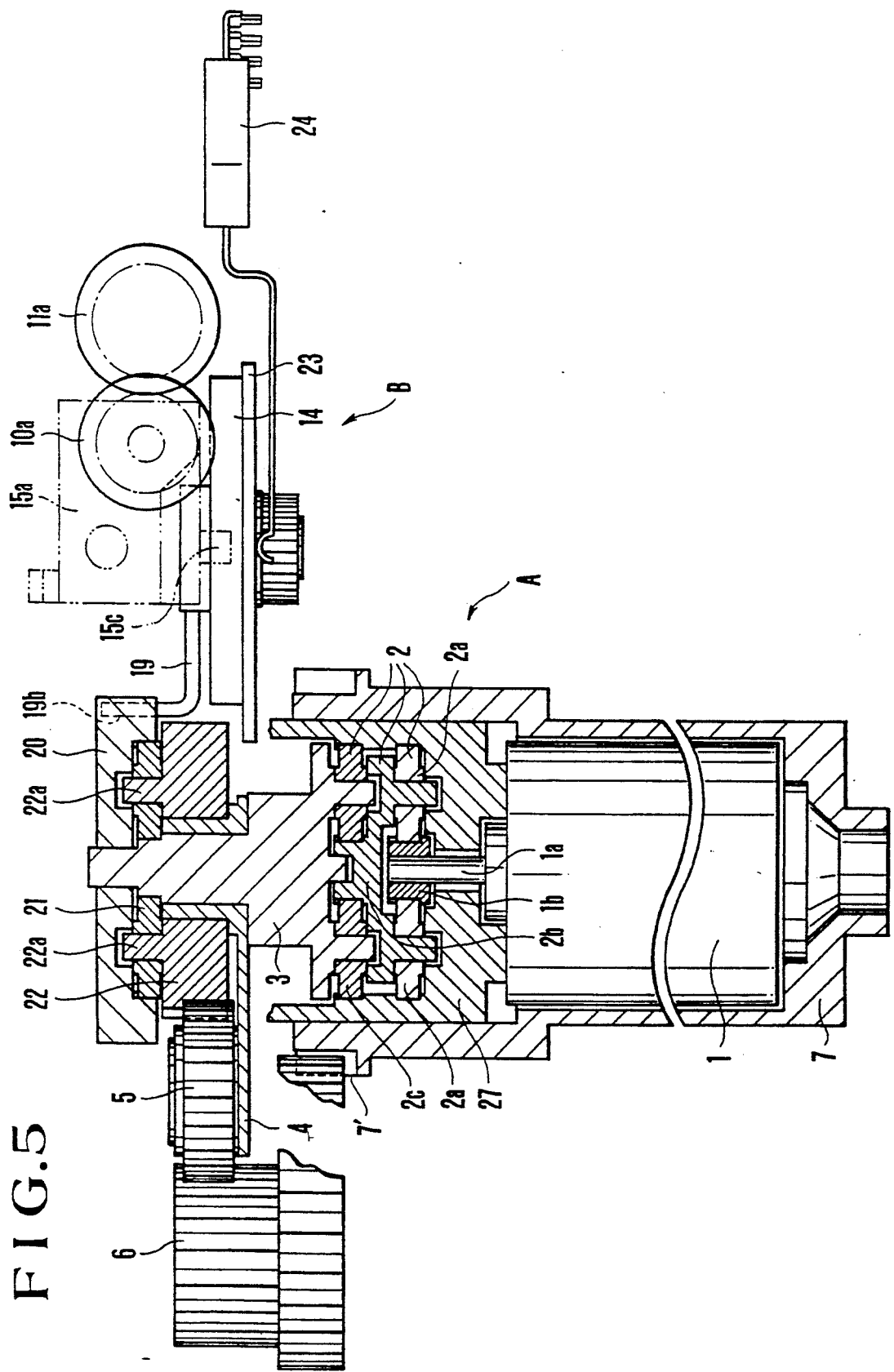
FIG. 5 is a vertical sectional view showing the driving part of FIG. 1.

As shown in the vertical sectional view of FIG. 5, a pinion $1b$ is fixed to an output shaft $1a$ of the driving motor 1, and three planetary gears $2a$, $2a$ and $2a$ which form a speed-reducing gear train 2 are meshed with the pinion $1b$. Each of the planetary gears $2a$, $2a$ and $2a$ is also meshed with an internal gear 27 which is fixedly disposed. As the pinion $1b$ rotates about its axis, the three planetary gears $2a$, $2a$ and $2a$ revolve around the pinion 1b. The revolution of the planetary gears 2a, 2a and 2a is transmitted through a carrier 2b to three planetary gears 2c, 2c and 2c meshed with the internal gear 27, causing the planetary gears 2c, 2c and 2c to revolve. The revolution of the planetary gears 2c, 2c and 2c causes a carrier 3 to revolve.

Figure 2:
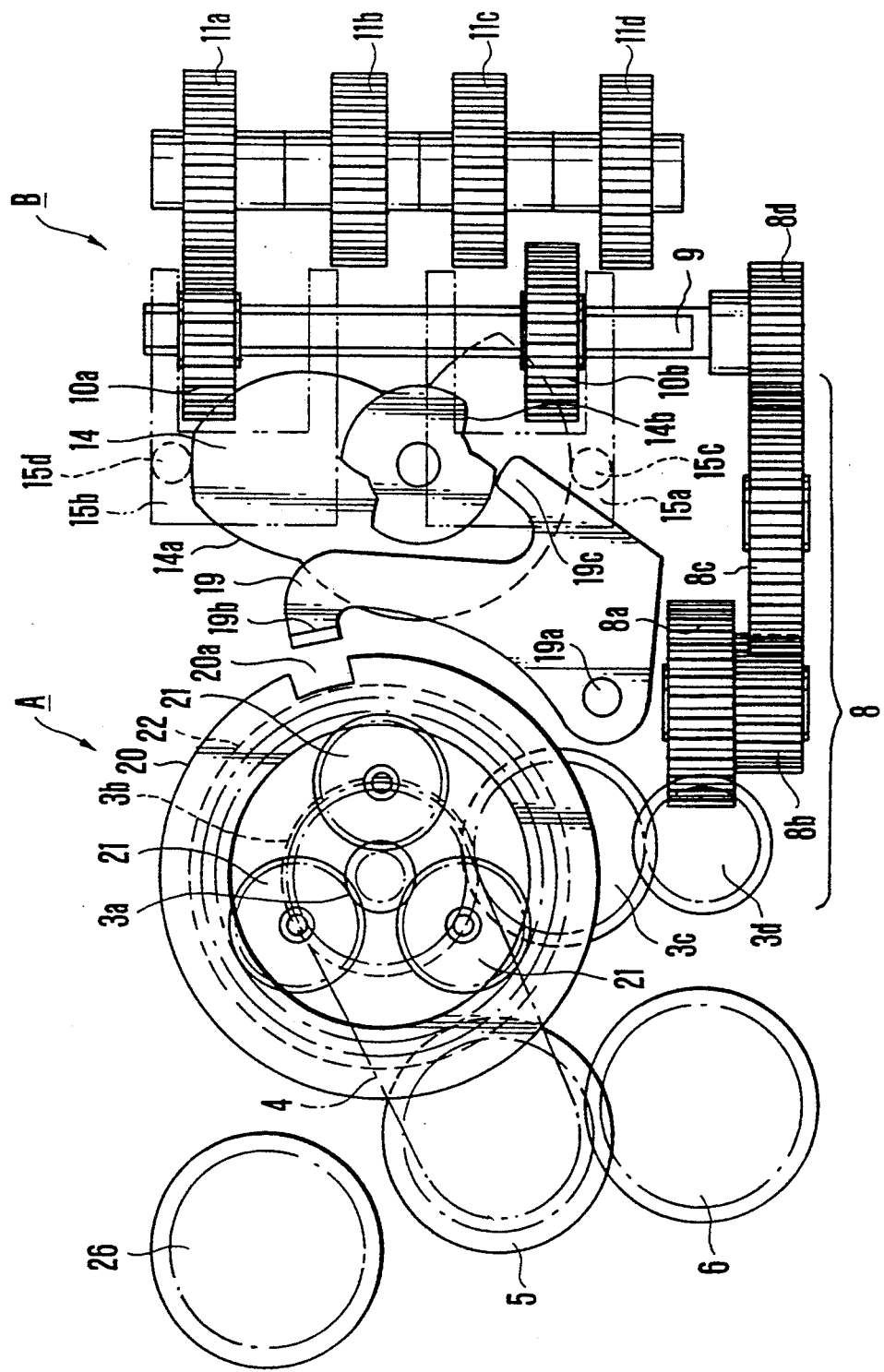
FIG. 2 is a schematic plan view of the arrangement shown in FIG. 1.
Figure 3:
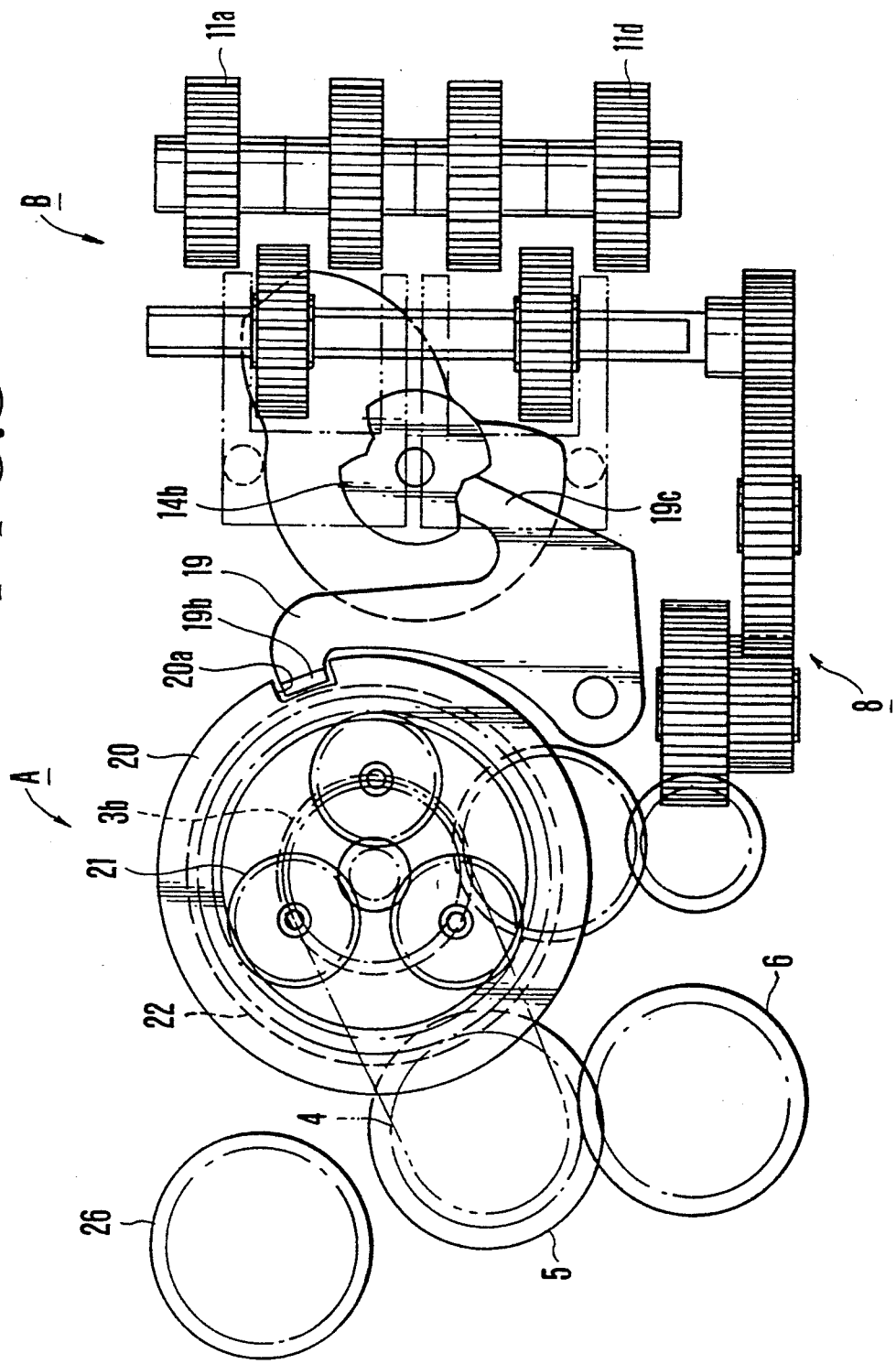
FIG. 3 is a plan view similar to FIG. 2, but showing the state of the arrangement during a film winding operation.
Figure 4:
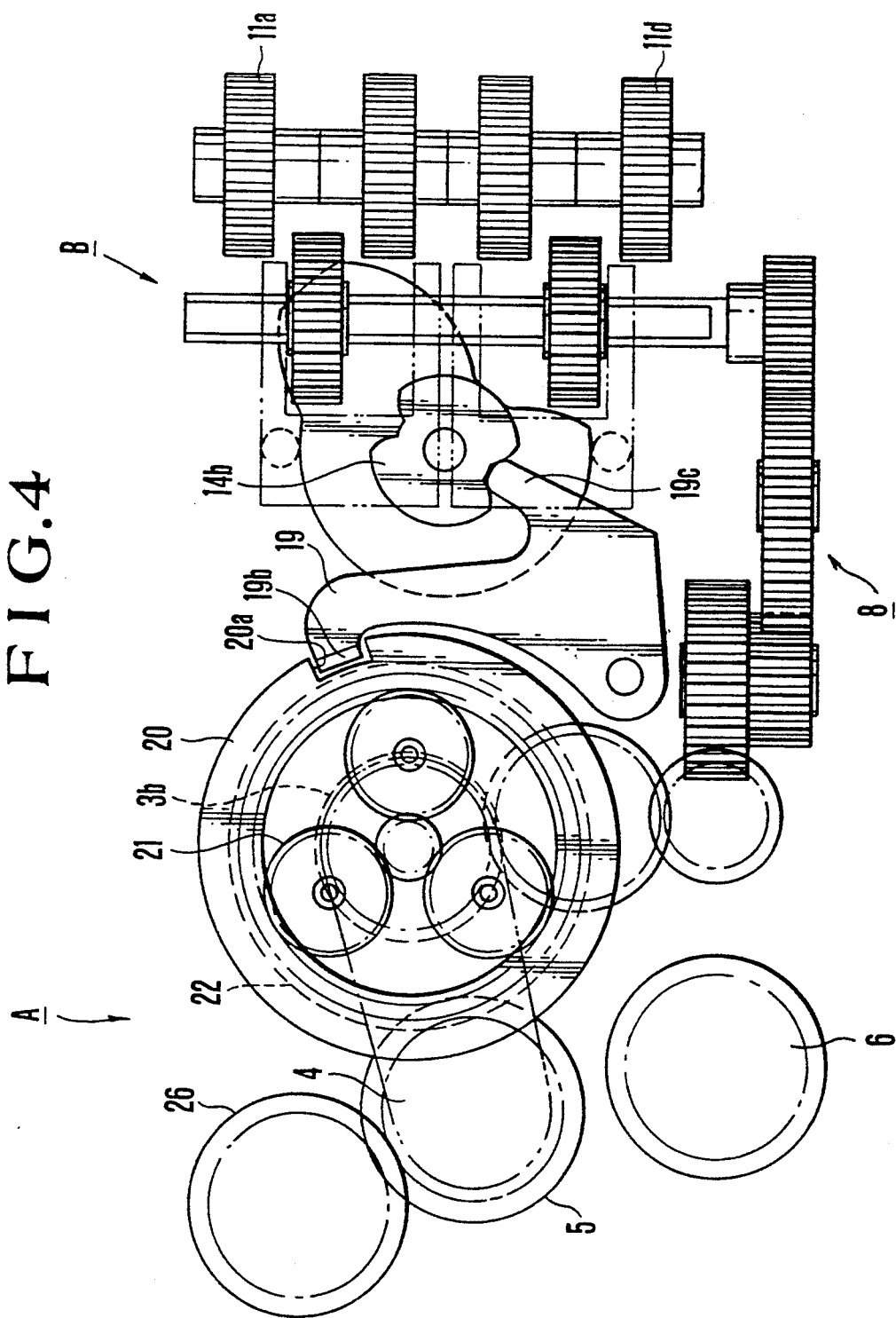
FIG. 4 is a plan view similar to FIG. 3, but showing the state of the arrangement during a film rewinding operation.

Referring back to FIG. 1, a gear 3b is fixed to the carrier 3 and, as shown in the plan view of FIG. 2, a gear 3c is meshed with the gear 3b so that a worm 3d can be rotated. The worm 3d reduces the speed of rotation and changes the direction of the driving axis 90 degrees, whereby the driving-force transmission shaft 9 is driven through the gear train 8 formed by elements 8a, 8b, 8c and 8d.

The driving-force transmission shaft 9 serves as a shaft for rotating driving gears 10a and 10b which drive the zoom barrel 25 and associated elements, which will be described later. The motor 1 also drives a gear train for winding and rewinding of a film.

As shown in FIGS. 1, 2 and 5, three planetary gears 21, 21 and 21 are meshed with a gear 3a of the carrier 3, and the three planetary gears 21, 21 and 21 are meshed with the internal gear portion of an engagement claw disk 20. If the engagement claw disk 20 is not retained, the planetary gears 21, 21 and 21 merely serve as an idler which rotates the engagement claw disk 20. If the engagement claw disk 20 is retained, it revolves while rotating about its axis and rotating a sun gear 22 formed integrally with shafts 22a which rotatably support the planetary gears 21, 21 and 21, respectively.

A single planetary arm 4 is rotatably secured to the carrier 3 at one end, and a gear 5 having a rotational friction is provided at the other end. The gear 5 is meshed with the sun gear 22, and selectively meshes with an idler 6 for film winding and a gear train 26 for film rewinding. The idler 6 is meshed with a gear 7a of the spool 7 for film winding which includes the driving motor 1. The gear train 26 is also meshed with the gear 7a.

The dividing part B is provided with a pair of followers 15a and 15b. The followers 15a and 15b are movable along a guide shaft 17 which is horizontally disposed. As also shown in the front elevational view of FIG. 6, the bottom faces of the followers 15a and 15b are provided with dowels 15c and 15d, respectively. The dowels 15c and 15d are attracted toward each other by a coiled spring 18 so that they can be pressed into contact with a dividing cam plate 14a. As shown in FIGS. 1 and 2, each of the followers 15a and 15b has a U-like shape in plan view, and driving gears 10b and 10a are provided inwardly of the U-like shapes of the followers 15a and 15b, respectively. The driving-force transmission shaft 9 is rotatably inserted through the followers 15a and 15b, and the driving gears 10a and 10b are secured to the transmission shaft 9. The transmission shaft 9 has a rectangular cross section, and the driving gears 10a and 10b are rotated integrally with the driving-force transmission shaft 9 but movably in the axial direction thereof (in the thrust direction). The transmission shaft 9 is provided with coiled bias springs 16 and 16 so that the driving gears 10a and 10b can be moved in the thrust direction by the restoring forces of the respective coiled bias springs 16 and 16.

As shown in FIG. 1, the dividing part B also includes a stopper spring member 50 as a locking means. The stopper spring member 50 is fixed to a base plate (not shown) at its root portion, and has four separate elongated portions. The ends of the respective elongated portions are provided with bent portions 50a, 50b, 50c and 50d which project downwardly. The bent portions 50a, 50b, 50c and 50d are disposed in meshed engagement with the teeth of corresponding dividing gears 11a, 11b, 11c and 11d. Each of the followers 15a and 15b is provided with a projection 15t having an arcuate end. The projections 15t and 15t press the bent portions 50a to 50d of the spring 50 upwardly during a dividing operation, whereby any one of the dividing gears 11a, 11b, 11c and 11d is selectively released from the engagement with the bent portions 50a to 50d.

A cam part 14 consists of a dividing cam plate 14a and a second cam plate 14b. As shown in FIG. 2, the dividing cam plate 14a has a generally snowman-like shape as viewed in plan view, and the dowels 15c and 15d of the followers 15a and 15b are in pressure contact with the dividing cam plate 14a. The second cam plate 14b has a shape formed by two combined sectors, and a follower 19c formed in one end of an engagement claw 19 is engaged with the second cam plate 14b. The engagement claw 19 has an engagement portion 19b at the other end so as to engage with a recess 20a of the engagement claw disk 20.

A pulse disk 23 is coaxially integrally provided on the cam part 14, and a detecting contact piece 24 is disposed in a position corresponding to the pulse disk 23.

Figure 6:
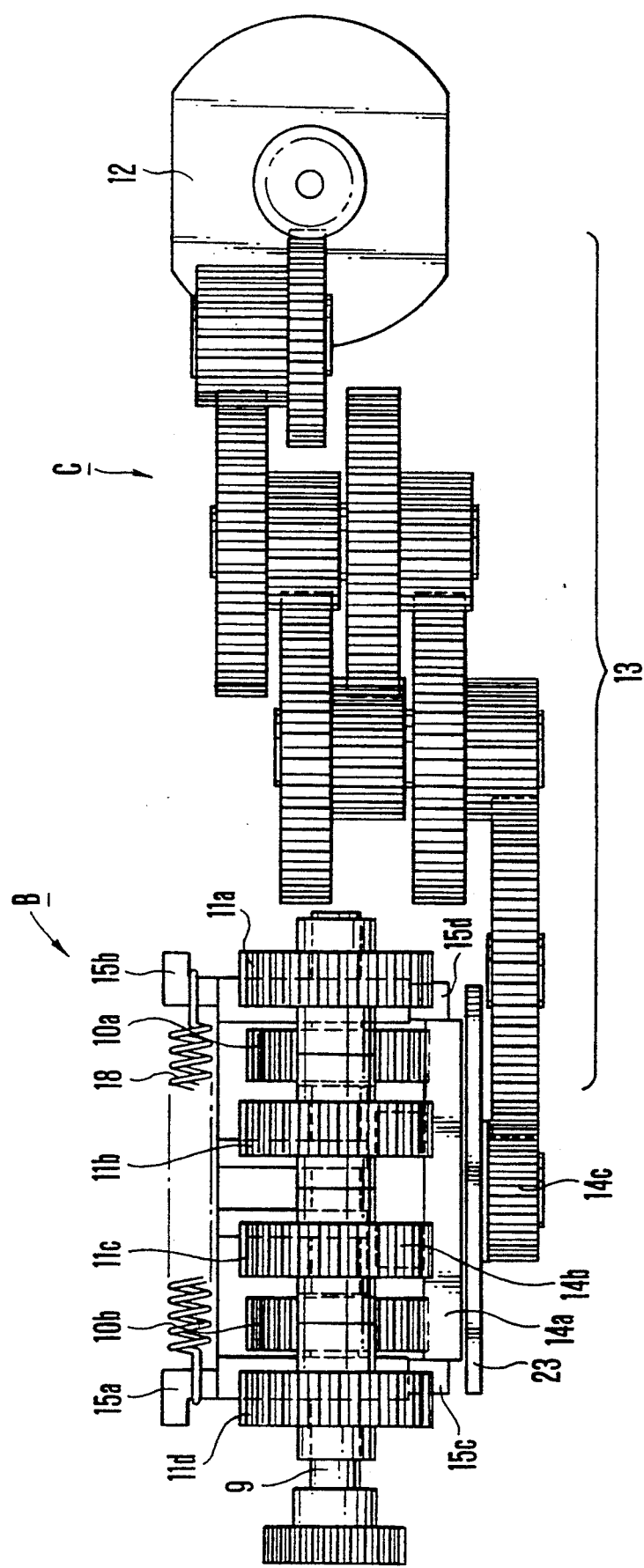
FIG. 6 is a front elevational view showing a dividing part and a dividing motor part, both of which are shown in FIG. 1.

As shown in FIGS. 1 and 6, the diving motor part c comprises a dividing motor 12 and a speed-reducing gear train 13. The rotary motion of the dividing motor 12 is transmitted through the gear train 13 to a cam gear 14c formed integrally with the cam part 14 so that the cam part 14 is appropriately driven.

Figure 7:
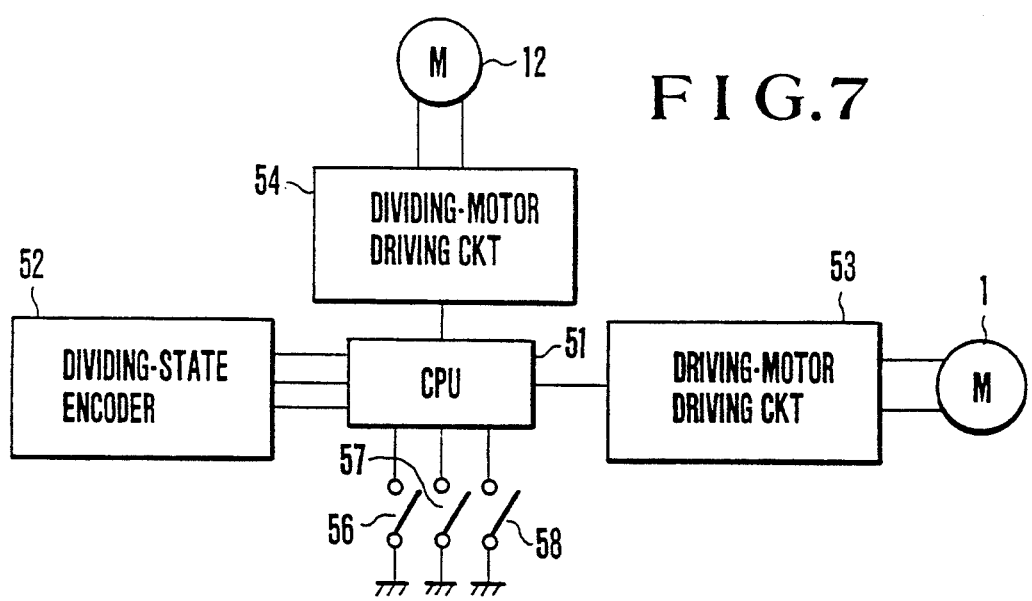
FIGS. 7, 10 and 16 are block diagrams showing respectively the circuit constructions of the first, second and third embodiments.

As shown in FIG. 7, a control circuit for controlling the dividing motor 12, the driving motor 1 and the like is provided with a CPU 51 utilizing a microcomputer or the like. The CPU 51 is arranged to receive a plurality of input signals, such as a zoom-barrel driving signal and a release signal, through input switches 56, 57 and 58. The control circuit is provided with a dividing-state encoder 52, and a signal encoded by the encoder 52 is also inputted to the CPU 51. The CPU 51, which has an arithmetic function, a comparing function and the like, performs arithmetic processing of the above-described input signals and outputs control signals to a dividing-motor driving circuit 54 and a driving-motor driving circuit 54, thereby driving the aforesaid driving motor 1 and dividing motor 12.

Figure 8:
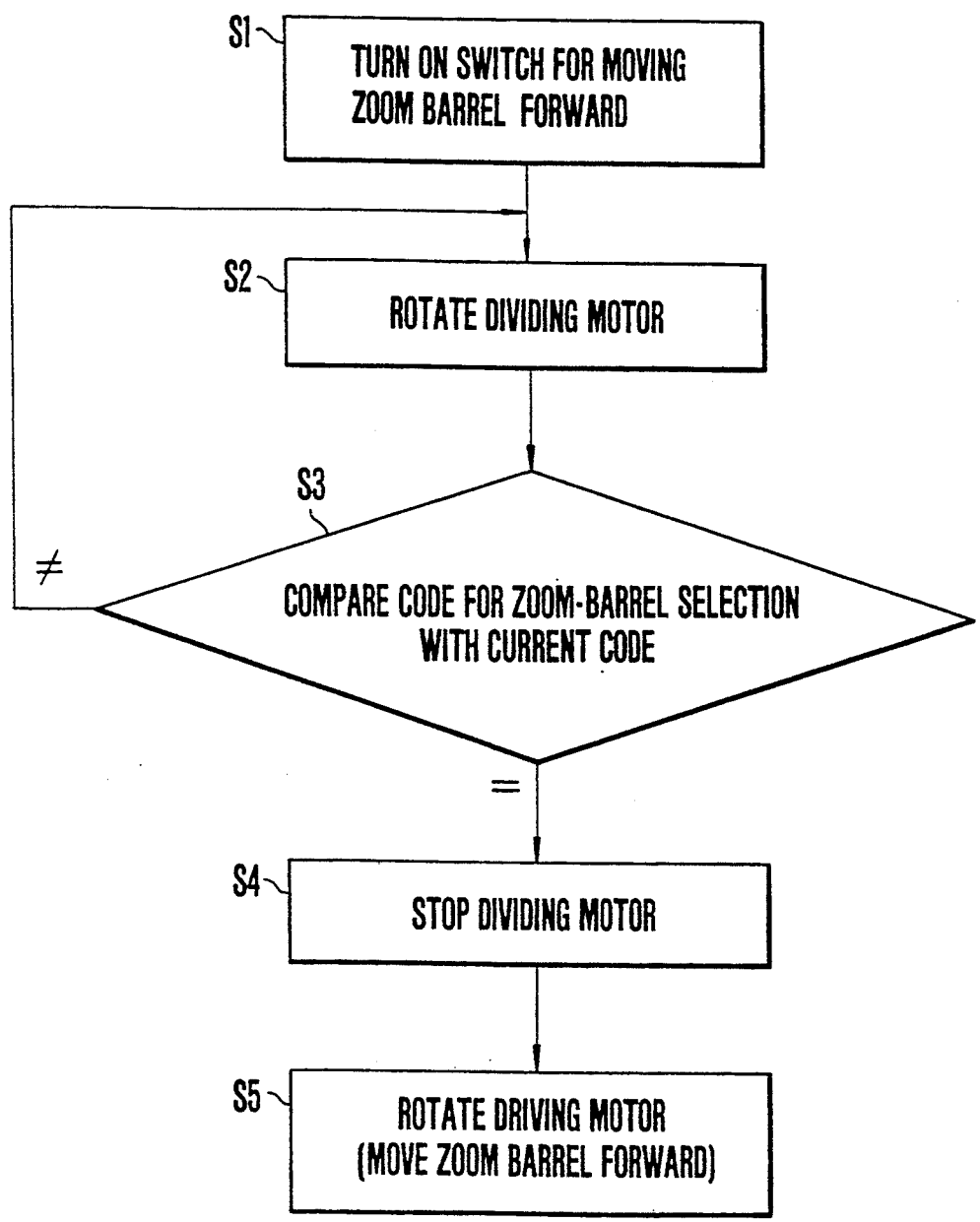
FIGS. 8, 11 and 17 are flowcharts showing respectively the operations of the circuits of FIGS. 7, 10 and 16.

The operation of the first embodiment will be described below with reference to the flowchart of FIG. 8.

When the switch 56 for causing the zoom barrel 25 to move toward a telephoto side is turned on by an external operating member provided on the camera, forward movement of the zoom barrel 25 is specified and a signal indicative of the forward movement is inputted to the CPU 51 (Step S1). Then, the CPU 51 outputs a signal to the dividing-motor driving circuit 54, thereby driving the dividing motor 12 (Step S2).

The rotary motion of the dividing motor 12 is transmitted to the cam gear 14c formed integrally with the cam part 14 through the speed-reducing gear train 13, whereby the dividing cam plate 14a, the second cam plate 14b and the pulse disk 23 are driven. Since the dowels 15c and 15d of the followers 15a and 15b follow the cam plate 14a, the follower 15b travels along a guide shaft 17. When the driving gear 10a reaches a position where it meshes with the dividing gear 11a, the dividing motor 12 stops (Steps S3 and S4). At this time, the bent portion 50a of the stopper spring 50, which has been engaged with the dividing gear 11a, is pressed up by the projection 15t of the follower 15b. Accordingly, the dividing gear 11a is released from the bent portion 50a of the stopper spring 50 and is allowed to rotate about its axis. In the meantime, the other dividing gears 11b, 11c and 11d remain locked by the bent portions 50b, 50c and 50d of the stopper spring 50, so that mechanisms for performing other operations, such as focus adjustment, opening and closing of a shutter and a shift to a close-up photography mode, are reliably prevented from being accidentally driven.

A decision as to a dividing operation is made in the following manner.

Information from the pulse disk 23 is read by the detecting contact piece 24, encoded by the encoder 52, and inputted to the CPU 51. The CPU 51 compares the input information with an internal code associated with zoom-barrel selection. If the CPU 51 determines that they coincide with each other, it outputs a stop signal for stopping the dividing-motor 12 to the dividing-motor driving circuit 54, thereby stopping the driving motion of the dividing-motor 12.

After the dividing motor 12 has been stopped, the CPU 51 causes the motor driving circuit 53 to drive the driving motor 1 (Step S5), thereby driving the transmission shaft 9 through a transmission path formed by the pinion 1a, the planetary gears 2a, 2a and 2a, the carrier 2b, the planetary gears 2c, 2c and 2c, the gears 3b, 3c and the gear train 8 formed by the elements 8a, 8b, 8c and 8d. As a consequence, the driving gear 10a drives the dividing gear 11a to move the zoom barrel 25 forward (the focal length of a photographic optical system varies toward a long-focus side).

In the above-described dividing operation, if the phase of the driving gear 10a is coincident with that of the dividing gear 11a, the gears 10a and 11a will naturally mesh with each other and no special problem will take place. If the gears 10a and 11a are not coincident, they will not mesh with each other during the dividing operation. However, during the dividing operation, the driving gear 10a is at a standstill at the side of the driving gear 11a, while charging the spring 16 in the thrust direction. When the driving gear 10a starts to rotate and these phases coincide with each other, the driving gear 10a immediately travels toward the gear 11a and both immediately mesh with each other. Accordingly, in accordance with the first embodiment, since a dividing operation can be effected with the driving gear 10 kept stationary, the other dividing gears 11b, 11c and 11d connected to, for example, a shutter mechanism, are prevented from being accidentally rotated. In other words, malfunctions of the camera can be prevented.

When the CPU 51 specifies a particular lens dividing gear and the succeeding shutter dividing gear in response to the operation of a shutter release (not shown), the dividing gear 11c is initially selected through a process similar to the above-described one, so that a lens for focus adjustment is driven. Then, the dividing gear 11b is selected and the forward and reverse rotary motions required to open and close the shutter are similarly transmitted to the shutter mechanism.

While the driving gears 10a and 10b are being driven, the follower 19c of the engagement claw 19, which is arranged for rotation about a supporting point 19a, is rotated clockwise by the sectorial portion of the second cam plate 14b. The engagement portion 19b is therefore kept away from the recess 20a of the engagement claw disk 20, that is to say, the engagement claw disk 20 is placed in a rotatable state. Accordingly, the planetary gears 21, 21 and 21 which are meshed with the internal gear of the engagement claw disk 20 merely rotate as idle gears, and the sun gear 22 does not rotate. As a consequence, the spool 7 for film winding is not driven in either direction.

The following explanation is made in connection with a case where a film winding operation has been specified. As described above, the dividing motor 12 is initially activated to rotate the cam part 14 and the pulse disk 23 through the speed-reducing gear train 13. If the CPU 51 detects on the basis of information from the pulse disk 23 that the driving gears 10a and 10b are not meshed with any of the gears 11a, 11b, 11c and 11d, the CPU 51 stops the dividing motor 12. At this time, as shown in the plan view of FIG. 3, the follower 19c of the engagement claw 19 is positioned in a recess of the second cam plate 14b. Accordingly, the engagement portion 19b is placed in a state wherein it can engage with the recess 20a of the engagement claw disk 20. At this time, if the engagement portion 19b engages with the recess 20a as they stand, the engagement disk 20 does not rotate so that the planetary gears 21, 21 and 21 operate as planetary gears to rotate the sun gear 22 through the shafts 22a. More specifically, the rotary motion of the driving motor 1 is transmitted to the sun gear 22 through the planetary gears 21, 21 and 21 from the gear 3a of the carrier 3. The planetary gear 5 which is meshed with the sun gear 3a meshes with the idler 6 (refer to FIG. 3). The idler 6 drives the gear 7a to rotate the spool 7 for film winding, whereby the film is wound. On the other hand, in a case where the engagement portion 19b does not engage with the recess 20a of the engagement claw disk 20, when the driving motor 1 runs, the planetary gears 21, 21 and 21 serve as idlers to allow the engagement claw disk 20 to rotate. When the recess 20a reaches the position where the engagement portion 19b is located, they engage with each other so that the film is wound in a manner similar to the above-described manner.

If rewinding of exposed film is specified, the driving motor 1 used in the sequence of the above-described winding is reversed to effect rewinding in a similar manner. More specifically, when the driving motor 1 is reversed, the planetary gears 21, 21, 21, the sun gear 22 and the planetary gear 5 are also rotated in the reverse direction, so that the planetary gear 5 meshes with the rewinding gear train 26. The state at this time is shown in the plan view of FIG. 4.

A second embodiment of the present invention will be described below with reference to FIGS. 9 to 11. Although, in the above-described first embodiment, an exclusive dividing motor is adapted to drive the cam part for a dividing operation, the second embodiment is arranged in such a manner that the cam part is also driven by the driving motor without the use of the exclusive dividing motor. As shown in the plan view of FIG. 9, the second embodiment is arranged in such a manner that the cam gear 14c is driven via an idle 34 during a dividing operation, and when the dividing operation is completed, the driving gears 10a and 10b are driven through the worm 3d and the gear train 8 formed by the elements 8a, 8b, 8c and 8d.

Although not shown, the second embodiment is also provided with an element similar to the stopper spring 50 which serves as a locking means.

Figure 10:
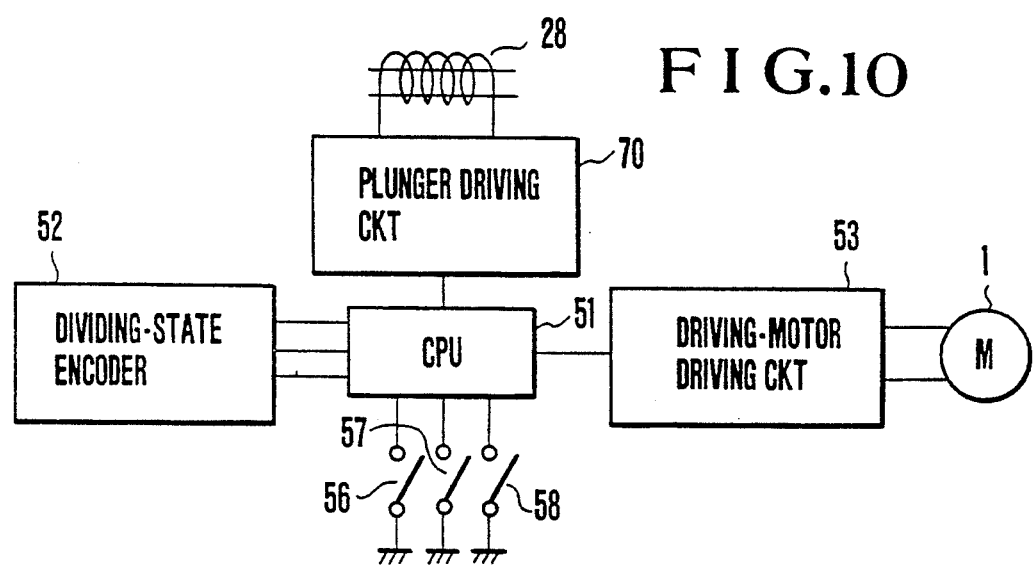
Figure 9:
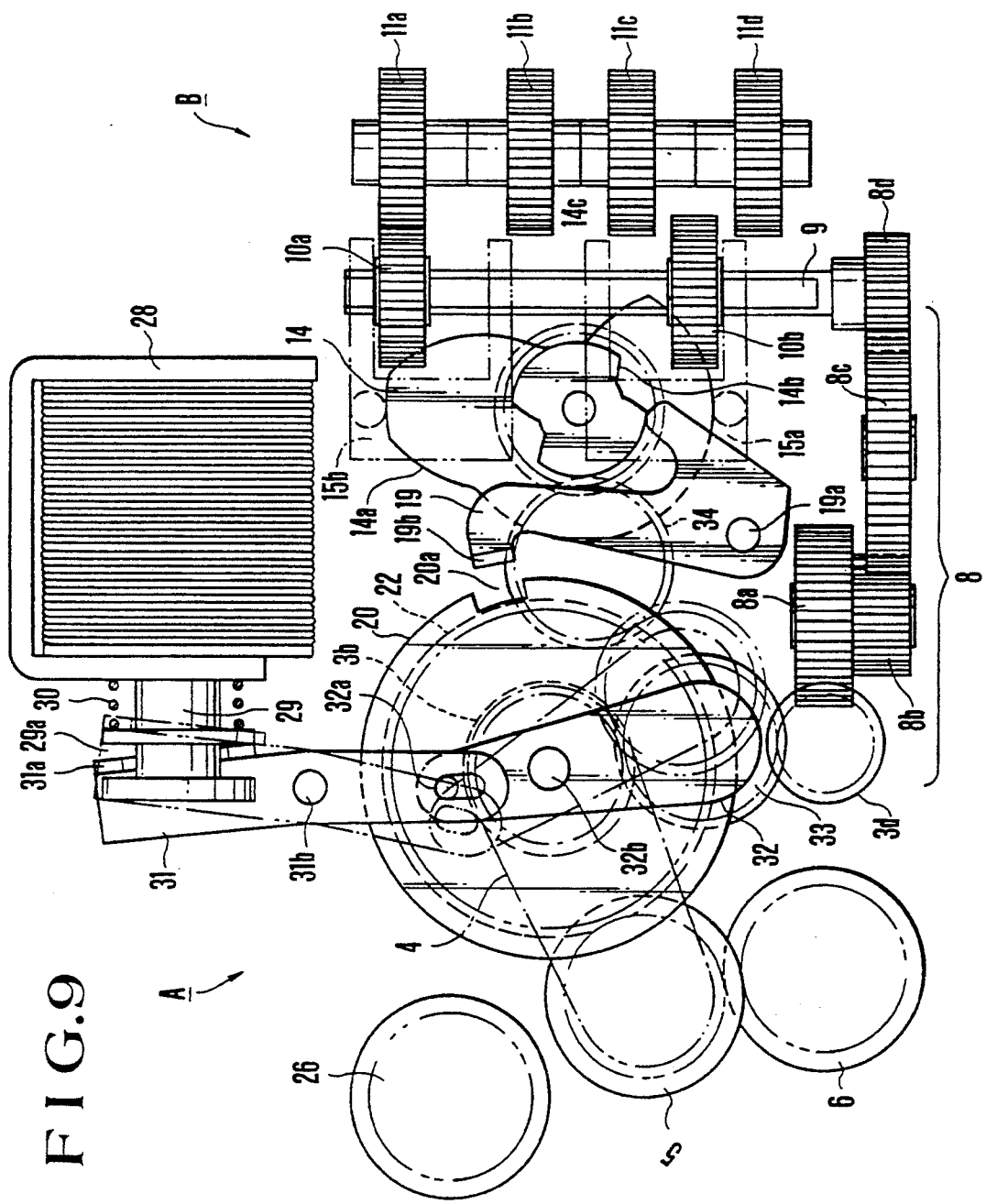
FIG. 9 is a plan view similar to FIG. 2, but showing a second embodiment of the present invention.
Figure 11:
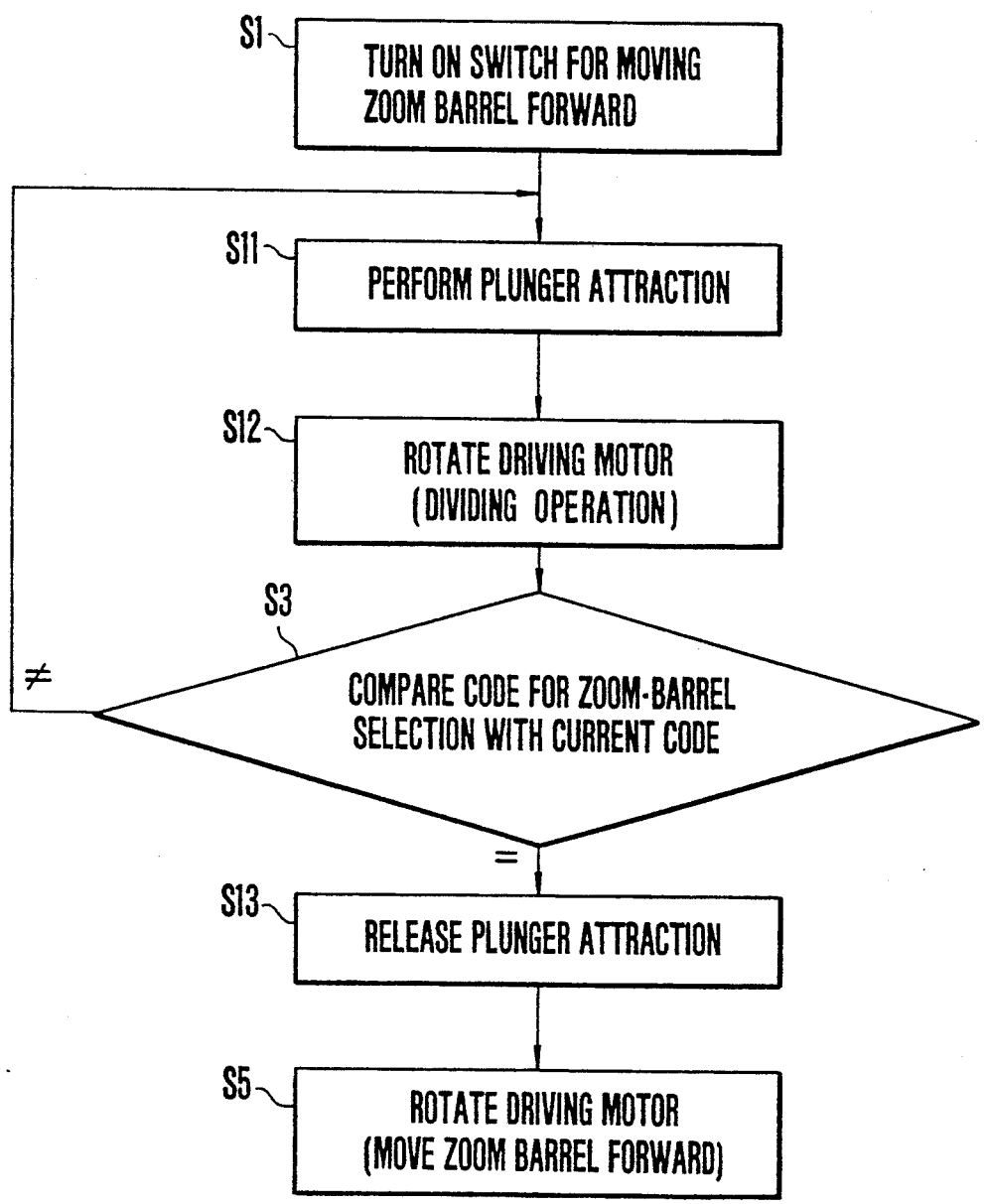

In FIGS. 9 and 10. identical reference numerals are used to denote elements which are substantially identical to those used in the first embodiment, and an explanation thereof is omitted.

Referring to FIG. 9, a dividing driving part generally comprises a plunger 28, a coupling lever 31 driven by the plunger 28, a switching lever 32 which is connected to the coupling lever 31 by a pin 32a and a slot, and a gear 33 disposed at one end of the switching lever 32, the gear 33 being meshed with the gear 3b and selectively with the idler gear 34 or the worm gear 3d.

The plunger 28 is provided with a yoke 29, which is urged by a spring 30 in a direction away from the plunger 28. A bent-up portion 31a of the coupling lever 31 is inserted in a gap 29a defined at one end of the yoke 29. Accordingly, if the plunger 28 attracts or releases the yoke 29, the coupling lever 31 pivots about a pivotal axis 31b, while the switching lever 32 pivots about a pivotal axis 32b. Since the pivotal axis 32b is positioned on the axis of the driving motor 1, the switching gear 33 always meshes with the gear 3b irrespective of the position of the switching lever 32. Accordingly, by utilizing the operation of the plunger 28, it is possible to transmit the driving force of the driving motor 1 via the gear 3b and the switching gear 33 to either the idler gear 34 meshed with the cam gear 14c or the worm gear 3d for driving the driving gears 10a and 10b.

Similarly to the control circuit used in the first embodiment, the control circuit of the second embodiment comprises the CPU 51, the dividing-state encoder 52, the driving-motor driving circuit 53 and other elements. As shown in FIG. 10, the control circuit of the second embodiment further comprises a plunger driving circuit 70 in place of the dividing-motor driving circuit 54.

The operation of the second embodiment will be described below with reference to the flowchart of FIG. 11. The second embodiment is substantially similar to the first embodiment except that the dividing operation of dividing gears is implemented by the plunger. Accordingly, only parts associated with the dividing operation will be explained below, and an explanation of the operations of the other parts is omitted. In the flowchart of FIG. 11, identical numerals are used to denote steps which are identical to those shown in FIG. 8.

When the switch 56 for causing the zoom barrel 25 to move toward a telephoto side is turned on by the external operating member provided on the camera, forward movement of the zoom barrel 25 is specified (Step S1) and a signal indicative of the forward movement is inputted to the CPU 51. Then, the CPU 51 outputs a signal to the plunger driving circuit 70, thereby causing the plunger 28 to attract the yoke 29 to the right as viewed in FIG. 9 (Step S11). Accordingly, the coupling lever 31 pivots about the pivotal axis 31b, while the switching lever 32 pivots about the pivotal axis 32b to the position shown by a dashed line. Thus, the switching gear 33 meshes with the idler gear 34. Then, the CPU 51 outputs a signal to the driving-motor driving circuit 53 and causes the circuit 53 of the driving motor 1 is transmitted to the cam gear 14c via the gear 3b, the switching gear 33 and the idler 34, whereby the dividing gear 11a is selected to be driven in a manner similar to that explained in connection with the first embodiment.

When the dividing operation is completed (Step S3), the CPU 51 stops the plunger driving circuit 70 from driving the plunger 28 (Step S13). In this manner, since the attraction of the plunger 28 disappears, the yoke 29 is restored to the position shown by a solid line in FIG. 9 by the action of the spring 30. In turn, the switching gear 33 meshes with the worm 3d. When the CPU 51 outputs a signal to the driving-motor driving circuit 53 to cause the circuit 53 to drive the driving motor 1 (Step S5), the driving force of the driving motor 1 is transmitted to the driving gear 10a and the dividing gear 11a via the gear 3b, the switching gear 33, the worm 3d and the gear train 8 formed by the elements 8a, 8b, 8c and 8d. As a consequence, the zoom barrel 25 is moved to the telephoto side by a predetermined amount.

When the CPU 51 specifies a particular lens dividing gear and the following shutter dividing gear in response to the operation of the shutter release (not shown), the dividing gear 11c is initially selected through a process similar to the above-described one, so that a lens for focus adjustment is driven. Then, the dividing gear 11b is selected and the forward and reverse rotary motions required to open and close the shutter are similarly transmitted to the shutter mechanism.

In accordance with the second embodiment, since a single driving motor can be used to implement a dividing operation, it is possible to provide a compact camera at a reduced cost.

A third embodiment of the present invention will be described below with reference to FIGS. 12 to 17. In the third embodiment, a single motor is used to drive a film winding gear as well as a zoom barrel and the like. To implement the single-motor arrangement, five dividing gears 117 to 121 are concentrically arranged as shown in the plan view of FIG. 13, and the dividing gears 117 to 121 are meshed with output gears 123, 124, 125, 126 and 127, respectively.

Figure 12:
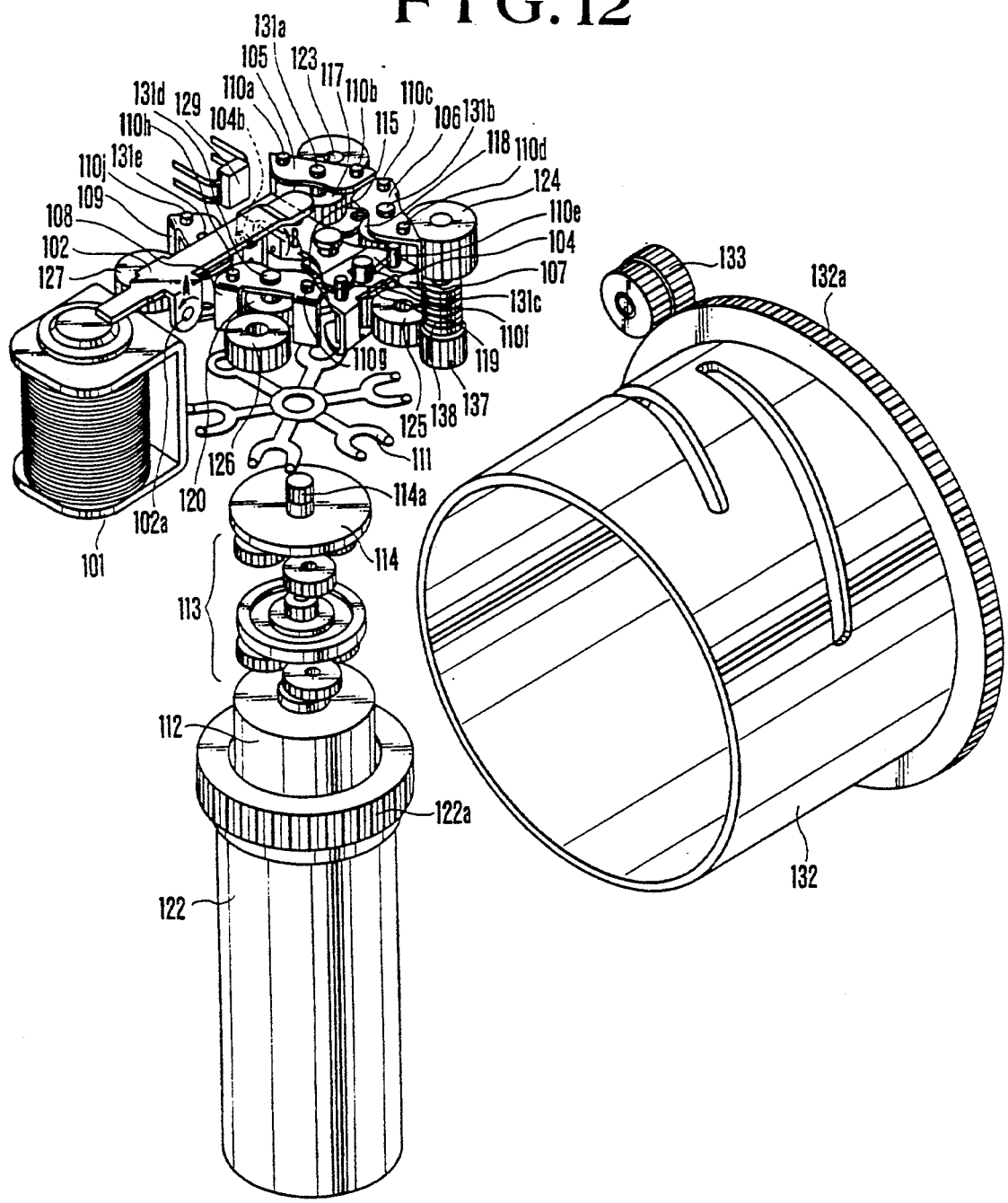
FIGS. 12 to 15 are views showing a third embodiment of the present invention.

FIG. 12 is an exploded perspective view showing the essential parts of a camera according to the third embodiment. In FIG. 12, the output gear 124 is meshed with a gear 122a of a film winding spool 122. The output gear 123 drives a shutter driving mechanism, the output gear 125 drives a zoom barrel 132 via a gear 137, a worm 138 and gears 133 and 132a, the output gear 126 drives a lens driving mechanism for focus adjustment, and the output gear 127 drives a driving mechanism for shifting the optical system to a close-up photography state.

Figure 15:
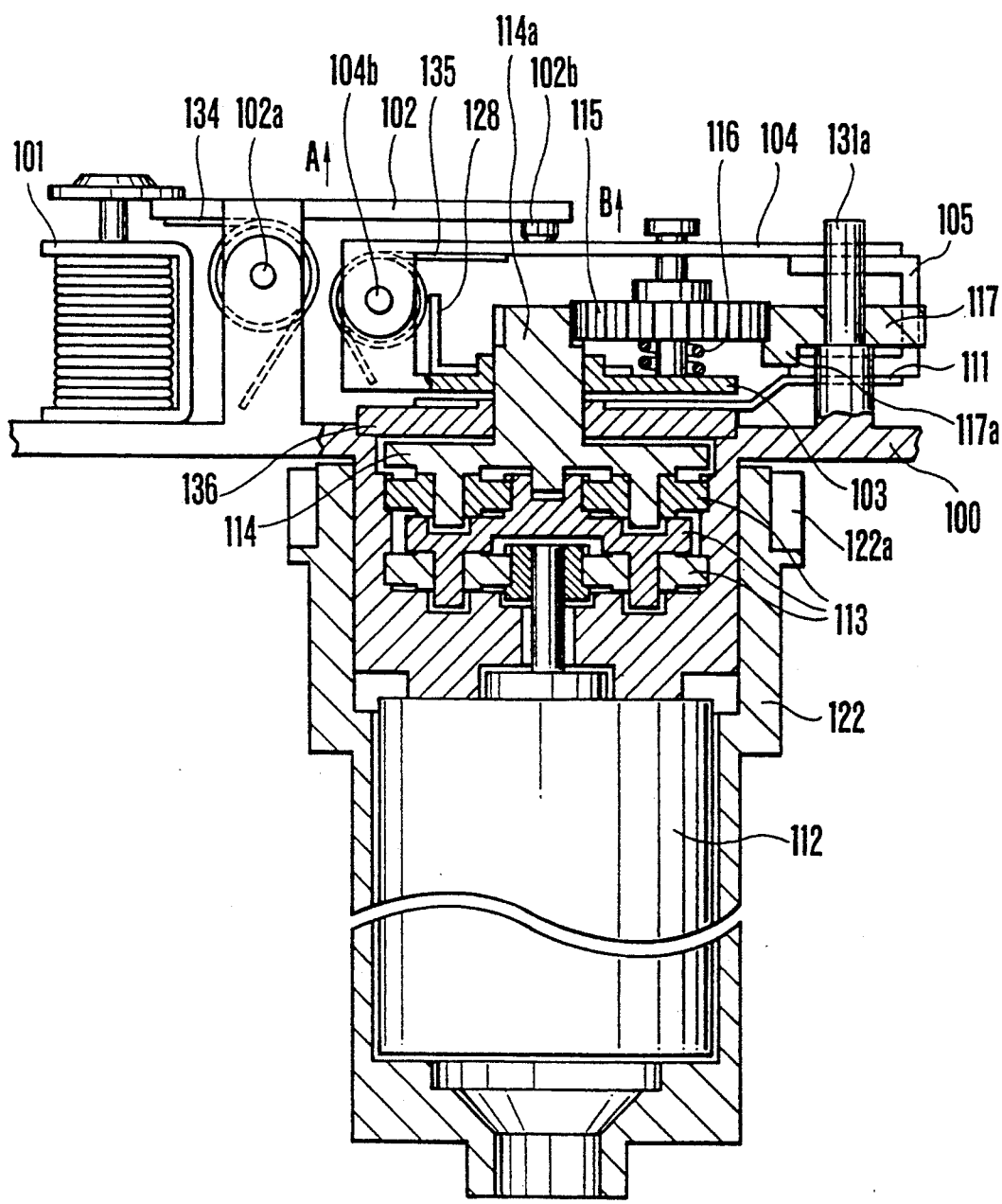

Gear engagement members 105 to 109 are disposed to rotatably support the dividing gears 117 to 121. As shown in the plan view of FIG. 13, each of the gear engagement members 105 to 109 has an approximately trapezoidal shape. As shown in the vertical sectional view of FIG. 15, each of the gear engagement members 105 to 109 has an approximately U-like shape. The dividing gears 117 to 121 are supported by means of dowels 131a to 131e in the interiors of the gear engagement members 105 to 109, respectively. Each of the gear engagement members 105 to 109 is vertically movably supported by one pair of shafts which are upright formed on a base plate 100 as shown in FIG. 15, each pair including shafts 110a, 110b; 110c, 110d; 110e, 110f; 110g, 110h; and 110i, 110j. The gear engagement members 105 to 109 also have recesses for engagement with projections 117a to 121a which are respectively formed in the bottoms of the dividing gears 117 to 121.

A mechanism for driving the above-described dividing gears or output gears is constructed in the following manner. As shown in FIGS. 12 and 15, the output speed of a driving motor 112 incorporated in the film winding spool 122 is reduced by a speed-reducing gear train 113 utilizing planetary gears. A single planetary gear 115 is meshed with an output gear 114a formed integrally with a carrier 114, and the dividing gears 117 to 121 are arranged to be selectively driven by the planetary gear 115.

The planetary gear 115 is rotatably supported by a planetary arm 104, and a friction spring 116, which is disposed on a supporting arm 103 rotatably supported by the carrier 114, is in pressure contact with the bottom of the planetary gear 115.

Figure 13:
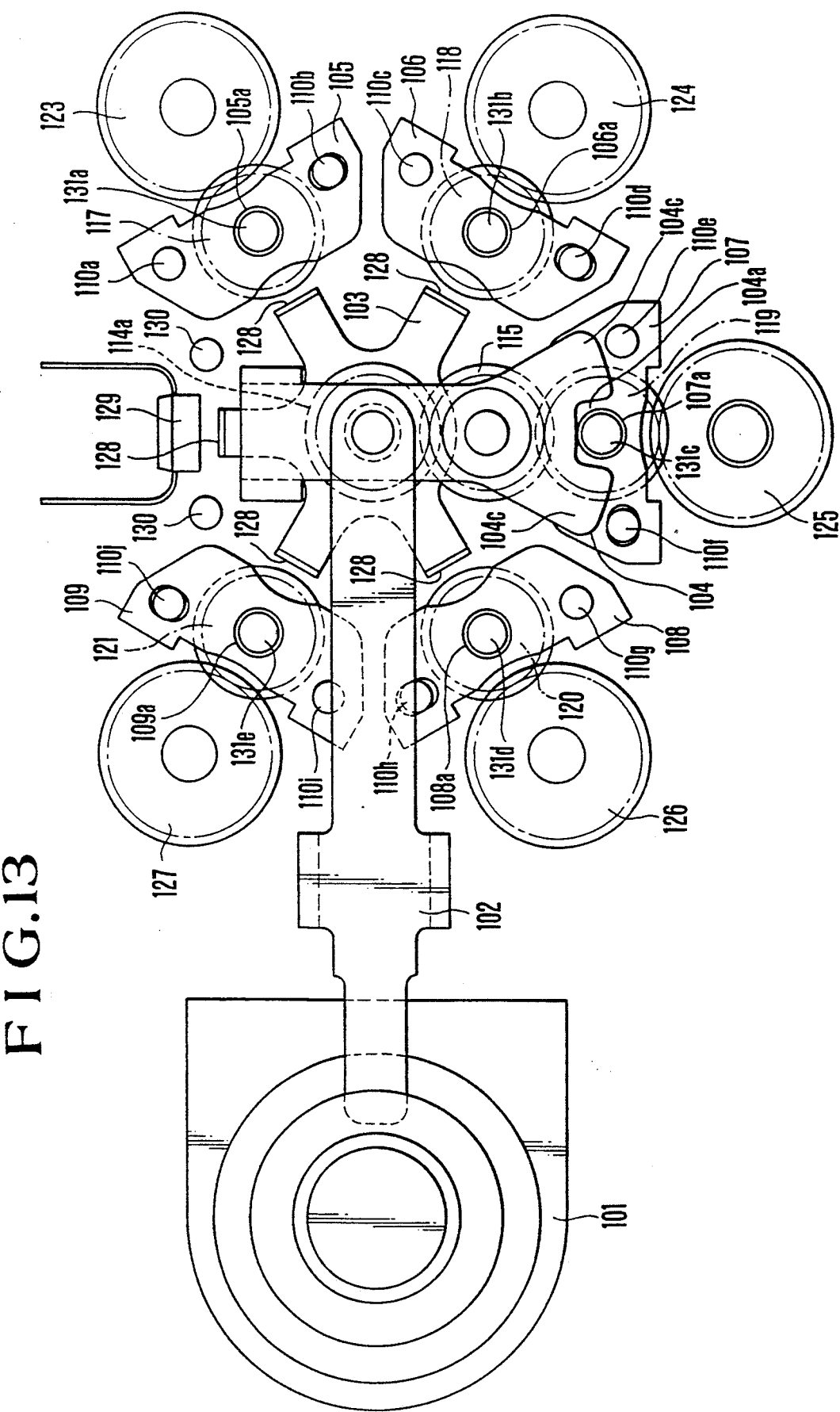
Figure 14:
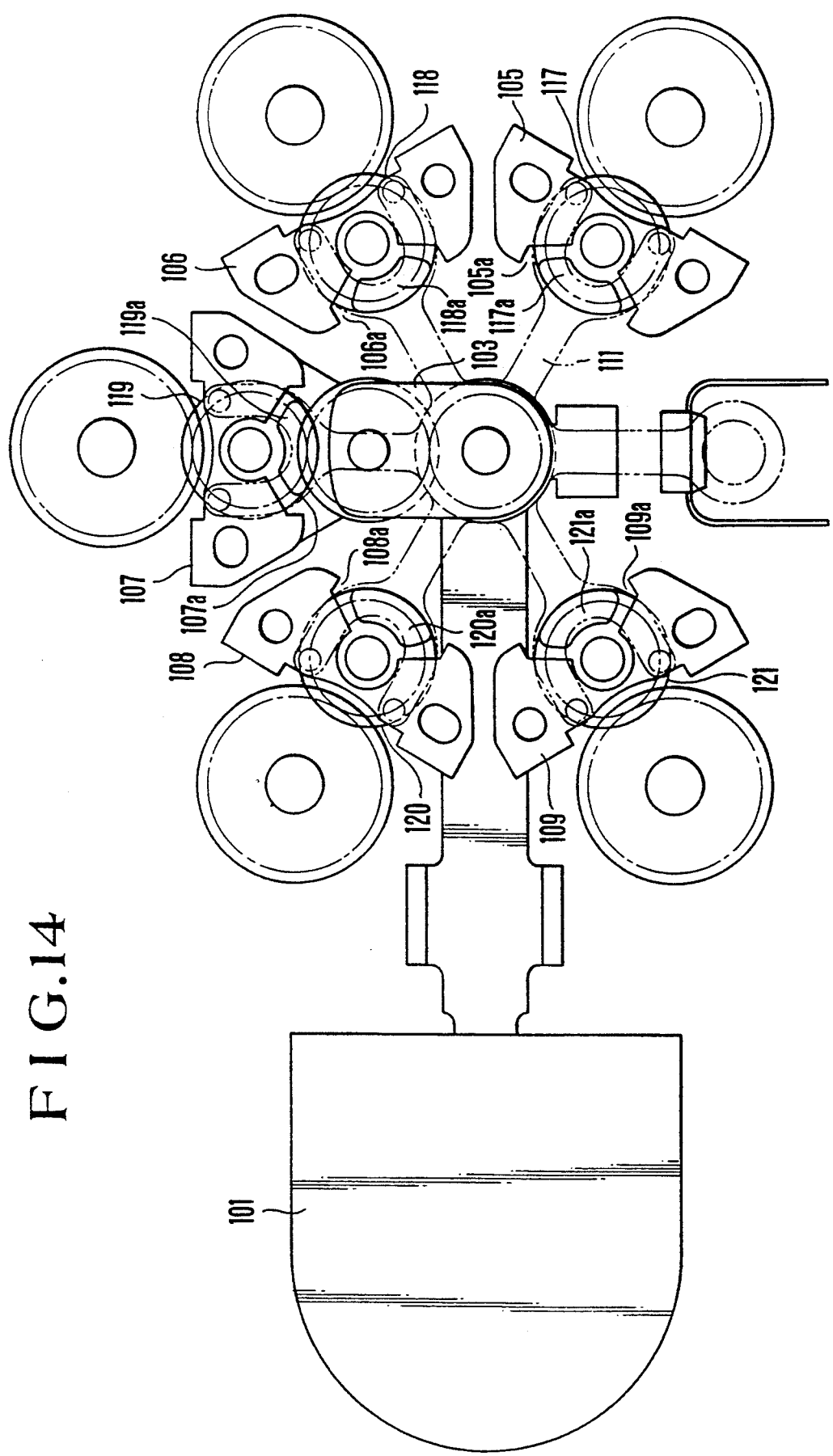

As shown in FIG. 13 in plan view, the portion of v the planetary arm 104 which is positioned on a dividing-gear side is enlarged to form sectorial portions 104c and 104c. A cutout 104a is formed between the sectional portions 104c and 104c. As shown in FIG. 15, the end of the planetary arm 104 opposite to the cutout 104a is rotatably supported on the supporting arm 103 by a shaft 104b and is urged in the counterclockwise direction by a spring 135. An intermediate portion of the planetary arm 104 is pressed by a projection 102b of a transmission arm 102 so that the counterclockwise rotation is restricted. Accordingly, when the plunger 101 attracts the transmission arm 102, the transmission arm 102 is rotated about a shaft 102a against a spring 134 with respect to the base plate 100 in the direction indicated by an arrow A of FIG. 15, whereby the planetary arm 104 is released and pressed up (in the direction indicated by an arrow B) by the action of the spring 135.

A lock spring 111 is secured to a lid member 136 of the speed-reducing gear train 113 at a position between the lid member 136 and the supporting arm 103. As shown in FIG. 15, the lock spring 111 is bent upwardly to urge the gear engagement members 105 to 109 upwardly. Rotation restricting members 130 and 130 are upright disposed on the base plate 100 at a predetermined interval (refer to FIG. 13).

Figure 16:
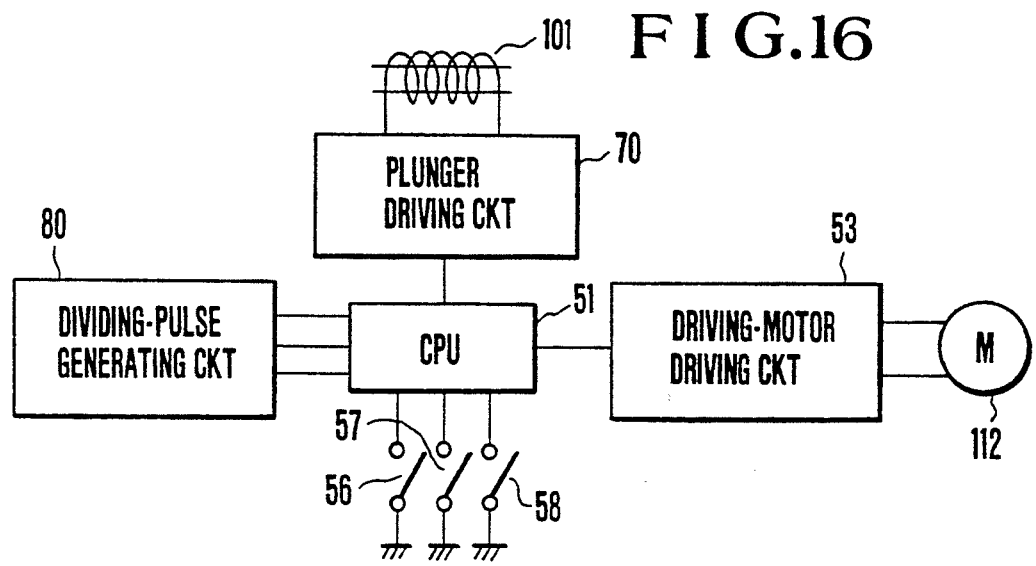

The dividing-pulse generating circuit 80 shown in FIG. 16 consists of five reflecting plates 128, 128, 128, 128 and 128, which are disposed on the supporting arm 103 at positions corresponding to the respective gear engagement members 105 to 109 and which rotate integrally with the supporting arm 103, and a reflection-type photoreflector 129 for detecting reflected light (refer to FIG. 13).

In the circuit construction of the third embodiment shown in FIG. 16, since the other elements are substantially similar to those of the first and second embodiments, identical reference numerals are used to denote such elements and an explanation thereof is omitted.

Figure 17:
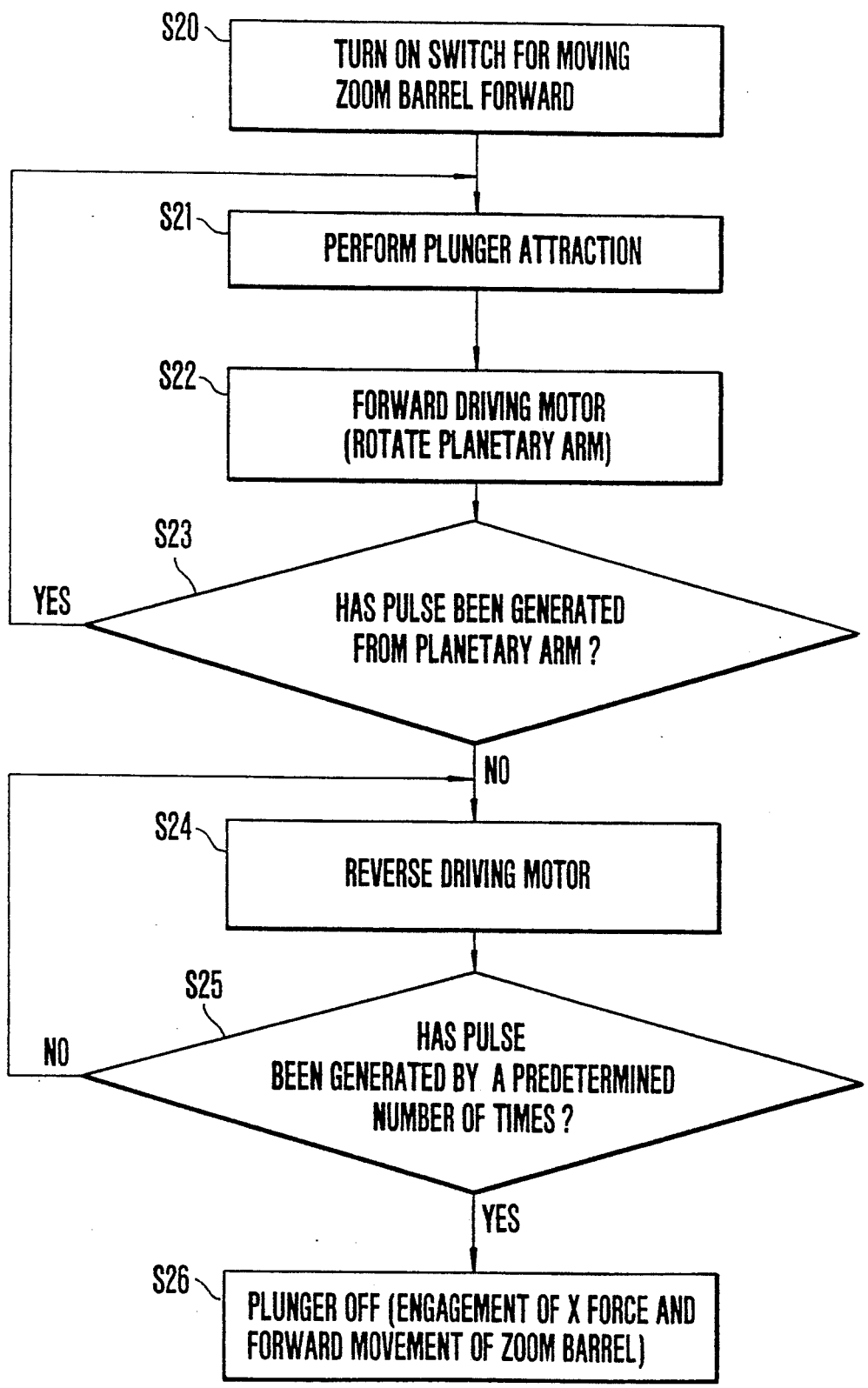

The operation of the third embodiment will be described below with reference to the flowchart of FIG. 17.

When, for example, the telephoto switch 56 for causing the zoom barrel 132 to move forward is turned on (Step S20), the CPU 51 outputs a signal to the plunger driving circuit 70, thereby causing the plunger 101 to attract the transmission arm 102 in the counterclockwise direction as viewed in FIG. 15 (Step S21). Thus, the planetary arm 104 is released, and is rotated by the action of the spring 135 in the direction indicated by the arrow B as viewed in FIGS. 12 and 15. In this state, the cutout 104a of the planetary arm 104 is released from the dowels 131a to 131e and is allowed to rotate about the carrier 114. At this time, the gear engagement members 105 to 109 are pressed upwardly by the lock spring 111 so that the recesses 105a to 109a engage with the respective projections 117a to 121a of the dividing gears 117 to 121. Accordingly, since the dividing gears 117 to 121 are locked, they are unable to rotate, that is to say, malfunctions of the camera can be prevented.

After the above-described operation, when the CPU 51 outputs a signal to the driving-motor driving circuit 53, the driving motor 112 is activated to run (Step S22), and the output gear 114a drives the planetary gear 115. At this time, the planetary gear 115 revolves about the output gear 114a since the friction spring 116 is disposed between the supporting arm 103 and the planetary gear 115.

As the supporting arm 103 rotates, the five reflecting plates 128, 128, 128, 128 and 128 integral therewith also rotate, and a pulse signal is provided at the photoreflector 129. If the next pulse is not outputted when a predetermined time elapses (Step S23), the CPU 51 determines that the planetary arm 104 is placed in its initial position in contact with the rotation restriction member 130, and reverses the driving motor 112 by means of the driving circuit 53 (Step S24).

In this state, when a pulse is outputted from the photoreflector 129 three times (Step S25), the CPU 51 determines that the planetary arm 104, hence the gear 115, has passed two dividing gears and selected a dividing gear 119 for the zoom barrel 132, and stops energization of the plunger 101 (Step S26). Thus, the transmission arm 102 is rotated by the action of the spring 134 in the direction opposite to the direction indicated by the arrow A shown in each of FIGS. 12 and 15. At this time, before the cutout 104a of the planetary arm 104 reaches a dowel 131c, the energization of the plunger 101 is stopped, and the dowel 131c is positioned below the sectorial portion 104c. This is because the photoreflector 129 outputs a pulse before the reflecting plate 128 faces the photoreflector 129.

When the planetary arm 104 further rotates, the cutout 104a of the planetary arm 104 engages with the dowel 131c, whereby the planetary arm 104 is secured. Accordingly, the planetary gear 115 serves as an idler to drives the dividing gear 119. When the cutout 104a of the planetary arm 104 engages with the dowel 131c, the planetary arm 104 leaves the dividing gear 119 and presses the gear engagement member 107 downwardly against the lock spring 111. Accordingly, the projection 119a of the dividing gear 119 is released from the recess 107a of the gear engagement member 107 so that the dividing gear 119 is placed in a rotatable state.

When the above-described dividing operation is performed, the output gear 125 is driven by the dividing gear 119 and the zoom barrel 132 is driven toward the telephoto side via the gear 137, the worm 138 and the gears 133 and 132a.

When the CPU 51 specifies a lens driving operation and the succeeding shutter dividing operation in response to the operation of the shutter release (not shown), the dividing gear 126 is initially selected through a process similar to the above-described one to transmit a driving force, thereby effecting a lens driving operation for focus adjustment. Then, the dividing gear 123 is selected and the forward and reverse rotary motions required to open and close the shutter are transmitted to the shutter mechanism.

During winding or rewinding of a film, the dividing gear 118 is selected by a similar operation, whereby the output gear 124 meshed with the gear 122a of the film winding spool 122 is driven.

In accordance with the third embodiment, since a plurality of independent outputs can be produced by a single driving motor as in the first and second embodiments, it is possible to provide a compact camera at a reduced cost. Since such independent outputs can be obtained, the device can be prepared as a standardized unit to facilitate application to other kinds of products. In addition, since a power dividing unit is disposed near the driving motor provided in a spool, transmission efficiency for film winding is improved and installation space can be saved. It is to be noted that, since the third embodiment is, of course, provided with a lock spring, malfunctions in the dividing operation of a camera can be reliably prevented.

Although, in each of the above-described embodiments, dividing of the power of a motor is effected in the order: zoom operation, focus adjustment and shutter operation, the order can be freely altered, and such dividing can be applied to any kind of mechanism.

Although motors and gears are used in each of the above-described embodiments, it is, of course, possible to similarly apply the present invention to an arrangement in which a different kind of driving source or transmission means is employed.

As is apparent from the foregoing, in accordance with each of the above-described embodiment, it is possible to provide a power dividing device for a camera which has a simple construction, a compact size and a reduced price and which can reliably realize a stable operation as well as improved versatility and expandability.

What is claimed is:

1. A power dividing device for a camera comprising:
   (A) a motor;
   (B) output means for outputting a driving force of said motor;
   (C) at least three transmission means for transmitting the driving force of said motor to a plurality of individual operating parts of said camera to be operated by the driving force of said motor;
   (D) connecting means for enabling said output means to be selectively connected to said at least three transmission means in random order; and
   (E) controlling means for controlling said connecting means by determining a positional relationship between said output means and said at least three transmission means.

2. A device according to claim 1, wherein said output means includes an output gear.

3. A device according to claim 2, wherein said transmission means includes a transmission gear which meshes with said output gears.

4. A device according to claim 1, wherein said transmission means includes a transmission gear.

5. A device according to claim 1, wherein said connecting means includes means for enabling said output, means to be connected to any of said at least three transmission means in random order by displacing said output means.

6. A device according to claim 5, wherein said controlling means includes a second motor for displacing said output means.

7. A device according to claim 5, wherein said controlling means includes means for displacing said output means by the driving force of said motor.

8. A device according to claim 5, wherein said controlling means includes detecting means for determining said positional relationship by detecting the displacement of said output means.

9. A device according to claim 8, wherein said detecting means includes pulse-signal outputting means.

10. A device according to claim 9, wherein said pulse-signal outputting means includes optical detecting means.

11. A device according to claim 1, wherein said controlling means includes pulse outputting means for detecting said positional relationship.

12. A device according to claim 11, wherein said pulse outputting means includes optical detecting means.

13. A device according to claim 1, further comprising inhibiting means for inhibiting the operation of said at least three transmission means.

14. A device according to claim 13, further comprising releasing means for releasing said transmission means connected to said output means from the operation of said inhibiting means.

15. A device according to claim 1, further comprising means for inhibiting said output means from outputting the driving force of said motor when said output means and said transmission means are connected by said connecting means.

16. A device according to claim 1, further comprising absorbing means for absorbing incorrect connection between said output means and said transmission means if said output means and said transmission means are not correctly connected.

17. A device according to claim 16, wherein said absorbing means includes a spring member.

18. A device according to claim 1, wherein said operating parts of said camera include an optical-system operating part.

19. A device according to claim 1, wherein said operating parts of said camera include a focal-length changing part.

20. A device according to claim 1, wherein said operating parts of said camera include a zoom barrel.

21. A device according to claim 1, wherein said operating parts of said camera include a film transporting part.

22. A device according to claim 1, wherein said operating parts of said camera include a focus adjustment part.

23. A device according to claim 1, wherein said operating parts of said camera include a shutter operating part.

24. A power dividing device for a camera comprising:
   (A) driving means;
   (B) output means for outputting a driving force of said driving means;
   (C) at least three transmission means for transmitting the driving force of said driving means to a plurality of individual operating parts of said camera to be operated by the driving force of said driving means;
   (D) connecting means for enabling said output means to be selectively connected to said at least three transmission means in random order; and
   (E) controlling means for controlling said connecting means by determining a positional relationship between said output means and said at least three transmission means.

25. A device according to claim 24, wherein said output means includes an output gear.

26. A device according to claim 25, wherein said transmission means includes a transmission gear which meshes with said output gears.

27. A device according to claim 24, wherein said transmission means includes a transmission gear.

28. A device according to claim 24, wherein said connecting means includes means for enabling said, output means to be connected to any of said at least three transmission means in random order by displacing said output means.

29. A device according to claim 28, wherein said controlling means includes second driving means for displacing said output means.

30. A device according to claim 28, wherein said controlling means includes means for displacing said output means by the driving force of said driving means.

31. A device according to claim 28, wherein said controlling means includes detecting means for determining said positional relationship by detecting the displacement of said output means.

32. A device according to claim 31, wherein said detecting means includes pulse-signal outputting means.

33. A device according to claim 32, wherein said pulse-signal outputting means includes optical detecting means.

34. A device according to claim 24, wherein said controlling means includes pulse outputting means for detecting said positional relationship.

35. A device according to claim 34, wherein said pulse signal outputting means includes optical detecting means.

36. A device according to claim 24, further comprising inhibiting means for inhibiting the operation of said at least three transmission means.

37. A device according to claim 36, further comprising releasing means for releasing said transmission means connected to said output means from the operation of said inhibiting means.

38. A device according to claim 24, further comprising means for inhibiting said output means from outputting the driving force of said driving means when said output means and said transmission means are connected by said connecting means.

39. A device according to claim 24, further comprising absorbing means for absorbing incorrect connection between said output means and said transmission means if said output means and said transmission means are not correctly connected.

40. A device according to claim 39, wherein said absorbing means includes a spring member.

41. A device according to claim 24, wherein said operating parts of said camera include an optical-system operating part.

42. A device according to claim 24, wherein said operating parts of said camera include a focal-length changing part.

43. A device according to claim 24, wherein said operating parts of said camera include a zoom barrel.

44. A device according to claim 24, wherein said operating parts of said camera include a film transporting part.

45. A device according to claim 24, wherein said operating parts of said camera include a focus adjustment part.

46. A device according to claim 24, wherein said operating parts of said camera include a shutter operating part.

47. A camera comprising:
(A) a motor;
(B) output means for outputting a driving force of said motor;
(C) at least three transmission means for transmitting the driving force of said motor to a plurality of individual operating parts of said camera to be operated by the driving force of said motor;
(D) connecting means for enabling said output means to be selectively connected to said at least three transmission means in random order; and
(E) controlling means for controlling said connecting means by determining a positional relationship between said output means and said at least three transmission means.

48. A camera comprising:
(A) driving means;
(B) output means for outputting a driving force of said driving means;
(C) at least three transmission means for transmitting the driving force of said driving means to a plurality of individual operating parts of said camera to be operated by the driving force of said driving means;
(D) connecting means for enabling said output means to be selectively connected to said at least three transmission means in random order; and
(E) controlling means for controlling said connecting means by determining a positional relationship between said output means and said at least three transmission means.

49. A camera comprising:
(A) a motor;
(B) output means for outputting a driving force of said motor;
(C) a plurality of transmission means for transmitting the driving force of said motor to a plurality of operating parts of said camera to be operated by the driving force of said motor;
(D) connecting means for enabling said output means to be selectively connected to said plurality of transmission means; and
(E) lock means for locking any transmission means not connected with said output means.

50. A camera according to claim 49, wherein said lock means mechanically locks at least one of said plurality of operating parts.

51. A camera according to claim 49, further comprising means for inhibiting said output means from outputting the driving force of said motor when said output means and said transmission means are connected by said connecting means.

52. A camera according to claim 49, further comprising absorbing means for absorbing incorrect connection between said output means and said transmission means if said output means and said transmission means are not correctly connected.

53. A camera according to claim 50, further comprising means for inhibiting said output means from outputting the driving force of said motor when said output means and said transmission means are connected by said connecting means.

* * * * *

UNITED STATES PATENT AND TRADEMARK OFFICE
CERTIFICATE OF CORRECTION

PATENT NO. : 5,168,295

DATED : December 1, 1992

INVENTOR(S) : AKIRA YOSHIHARA

It is certified that error appears in the above-identified patent and that said Letters Patent is hereby corrected as shown below:

ON THE TITLE PAGE:

[54] TITLE
Please change "POWDER" to --POWER--.

[75] INVENTORS
"Akira Yoshihara, Kanagawa;" should read --Akira Yoshihara, Yokohama;--.

COLUMN 1
Line 2, "POWDER" should read --POWER--.

COLUMN 4
Line 27, "diving motor part c" should read --dividing motor part C--.
Line 46, "circuit 54," should read --circuit 53,--.

COLUMN 5
Line 49, "driving gear 10" should read --driving gear 10a--.

COLUMN 6
Line 30, "sun gear 3a" should read --sun gear 22--.
Line 61, "idle 34" should read --idler gear 34--.

COLUMN 7
Line 60, "circuit 53 of" should read --circuit 53 to drive the driving motor 1 (Step S12). The driving force of--.

COLUMN 9
Line 11, "v" should be deleted.

COLUMN 10
Line 39, "drives" should read --drive--.

UNITED STATES PATENT AND TRADEMARK OFFICE
CERTIFICATE OF CORRECTION

PATENT NO. : 5,168,295
DATED : December 1, 1992
INVENTOR(S) : AKIRA YOSHIHARA

It is certified that error appears in the above-identified patent and that said Letters Patent is hereby corrected as shown below:

COLUMN 11
  Line 23, "embodiment," should read --embodiments,--.
  Line 53, "output," should read --output--.

COLUMN 13
  Line 4, "said," should read --said--.

Signed and Sealed this

Twenty-sixth Day of April, 1994

Attest:

BRUCE LEHMAN

Attesting Officer   Commissioner of Patents and Trademarks